US009463991B2

(12) United States Patent
Lapin et al.

(10) Patent No.: US 9,463,991 B2
(45) Date of Patent: Oct. 11, 2016

(54) METHOD AND APPARATUS FOR THE TREATMENT OF WATER WITH A GAS OR NUTRIENT INFUSED LIQUID

(71) Applicants: Dennis Lapin, Orlando, FL (US); Brad McMahen, Orlando, FL (US)

(72) Inventors: Dennis Lapin, Orlando, FL (US); Brad McMahen, Orlando, FL (US)

(*) Notice: Subject to any disclaimer, the term of this patent is extended or adjusted under 35 U.S.C. 154(b) by 0 days.

(21) Appl. No.: 14/422,072

(22) PCT Filed: Oct. 23, 2013

(86) PCT No.: PCT/US2013/066416
§ 371 (c)(1),
(2) Date: Feb. 17, 2015

(87) PCT Pub. No.: WO2014/066524
PCT Pub. Date: May 1, 2014

(65) Prior Publication Data
US 2015/0218023 A1  Aug. 6, 2015

Related U.S. Application Data

(60) Provisional application No. 61/717,136, filed on Oct. 23, 2012, provisional application No. 61/824,244, filed on May 16, 2013, provisional application No. 61/940,554, filed on Feb. 17, 2014.

(51) Int. Cl.
| | |
|---|---|
| C02F 3/20 | (2006.01) |
| C02F 3/26 | (2006.01) |
| C02F 3/00 | (2006.01) |
| B01F 3/04 | (2006.01) |
| C02F 101/30 | (2006.01) |
| C02F 101/32 | (2006.01) |
| C02F 103/00 | (2006.01) |

(52) U.S. Cl.
CPC ............ *C02F 3/26* (2013.01); *B01F 3/04248* (2013.01); *C02F 3/006* (2013.01); *C02F 3/20* (2013.01); *C02F 3/201* (2013.01); *B01F 2003/0434* (2013.01); *B01F 2003/04212* (2013.01); *B01F 2003/04234* (2013.01); *B01F 2003/04432* (2013.01); *B01F 2003/04879* (2013.01); *C02F 2101/30* (2013.01); *C02F 2101/322* (2013.01); *C02F 2103/001* (2013.01); *C02F 2209/38* (2013.01); *C02F 2303/02* (2013.01); *Y02W 10/15* (2015.05)

(58) Field of Classification Search
None
See application file for complete search history.

(56) References Cited

U.S. PATENT DOCUMENTS 3,779,913 A * 12/1973 Martin ................ B01F 3/04106
                                                          210/220
4,235,719 A * 11/1980 Pearson ................ C02F 3/1289
                                                          210/195.1

(Continued)

*Primary Examiner* — Chester Barry
(74) *Attorney, Agent, or Firm* — Larry D. Johnson

(57) ABSTRACT

A method and apparatus for the treatment of water with a gas or nutrient infused liquid. One embodiment delivers an oxidized water supply to a wastewater digester medium by means of pure oxygen introduced to the water supply via a pressure vessel or other means to infuse the liquid. This oxygen infused liquid is delivered to the medium to be treated at a critically controlled depth via a surface float delivery system. The invention involves delivering the oxygen infused liquid via nozzles which are located strategically in the supernatant allowing an extended oxygen-water interface time without over oxidizing the sludge blanket below.

10 Claims, 1 Drawing Sheet

(56) References Cited

U.S. PATENT DOCUMENTS

| | | | |
|---|---|---|---|
| 5,316,682 A * | 5/1994 | Keyser | B01F 5/0476 |
| | | | 210/195.2 |
| 5,616,241 A | 4/1997 | Khudenko | |
| 5,624,562 A | 4/1997 | Scroggins | |
| 5,989,428 A | 11/1999 | Goronszy | |
| 2003/0188695 A1 | 10/2003 | Robohm | |
| 2006/0175263 A1 | 8/2006 | Rice et al. | |
| 2006/0201876 A1 * | 9/2006 | Jordan | B01D 61/14 |
| | | | 210/609 |
| 2006/0243664 A1 | 11/2006 | Pollock | |
| 2007/0039878 A1 | 2/2007 | Roberts et al. | |
| 2011/0156290 A1 * | 6/2011 | Wensloff | B01F 7/00733 |
| | | | 261/93 |
| 2011/0272831 A1 | 11/2011 | Pearson et al. | |

* cited by examiner

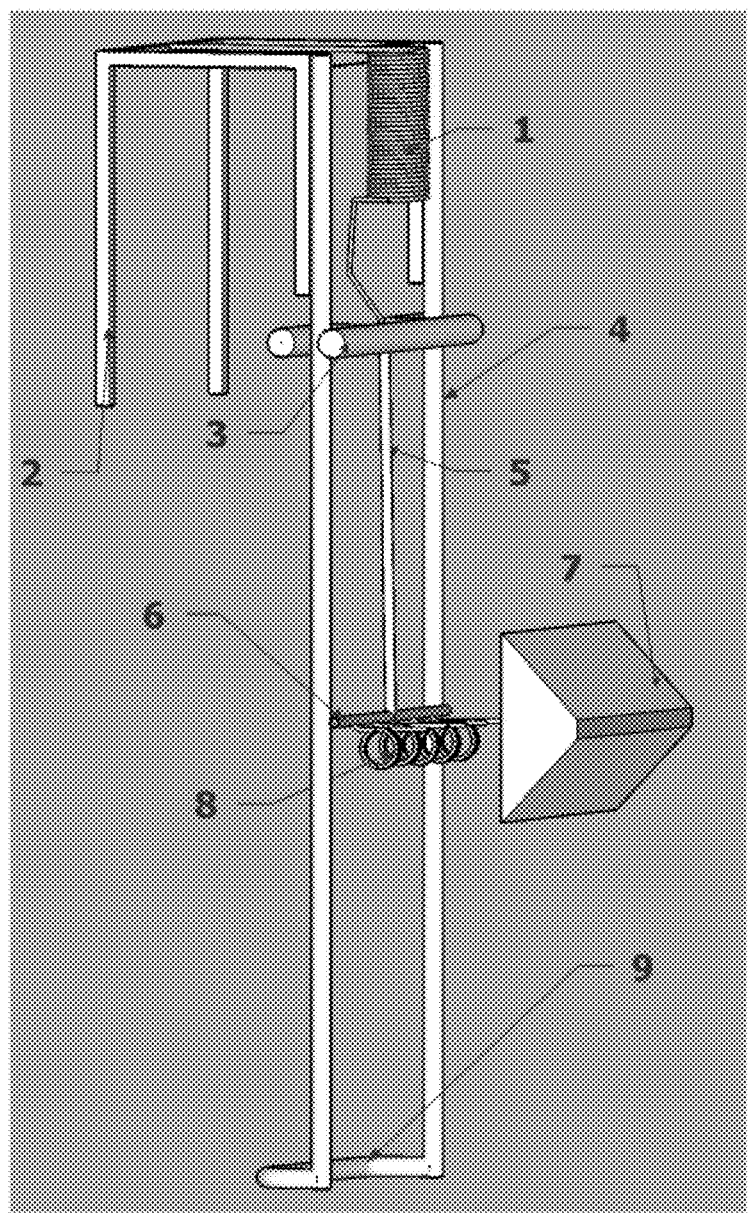

METHOD AND APPARATUS FOR THE TREATMENT OF WATER WITH A GAS OR NUTRIENT INFUSED LIQUID

CROSS REFERENCE TO RELATED APPLICATIONS

The present application is a 371 of PCT International Application Serial No. PCT/US13/66416, filed Oct. 23, 2013, which claims the benefit of U.S. Provisional Patent Application Ser. No. 61/717,136, filed Oct. 23, 2012, and U.S. Provisional Patent Application Ser. No. 61/824,244, filed May 16, 2013. The present application also claims the benefit of U.S. Provisional Patent Application Ser. No. 61/940,554, filed Feb. 17, 2014. The foregoing applications are incorporated by reference in their entirety as if fully set forth herein.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to the treatment of water, wastewater, and surface water, and more particularly to an improved method and apparatus for the delivery of a gas or nutrient infused liquid into a volume of water (e.g., a digester or a lift station that have fluctuating water columns), whether natural or manmade.

BACKGROUND INFORMATION AND DISCUSSION OF RELATED ART

This invention relates to the biological and non-biological treatment of water or wastewater which requires supplemental elements (such as oxygen, nutrients, or air) to catalyze or generally enhance treatment of the water volume, as well as any byproducts of such treatment. Byproducts may include, for example, odorous gases or wastewater sludge and the associated supernatant, which is the liquid lying above the digesting sludge mass within the treatment basin. An example of treatment would be the introduction of an oxygen infused water into a sludge digester basin primarily to improve odor, and/or biological and mechanical (settleability) treatment, although other benefits may be achieved if the oxygen level is sufficient and sustained in the targeted medium.

Maintaining the required oxygen level effectively is a wastewater industry challenge and the aeration process is typically the largest energy user associated with wastewater plant operations. Historically the typical aeration process is relatively inefficient in providing for oxygen transfer and the typical oxygen transfer mechanisms require substantial energy to process this oxygen with multiple delivery system components each requiring extensive maintenance. Historically, energy costs associated with wastewater aeration can account for 90% of all energy consumed at a wastewater treatment facility. The present invention provides a very efficient, low energy, low maintenance method of delivering oxygen via gas (oxygen) infused liquid (water) to the digestion process.

The digestion process is important for sludge stabilization and is a critical component in wastewater treatment. Aerobic digestion is the process of oxidizing and decomposing the organic component of wastewater sludge by microorganisms in the presence of oxygen. Aerobic digestion stabilizes sludge, reduces biological mass and volume, and reduces vector attraction and pathogenic organisms. Aeration can bring about the physical removal of odor-producing substances in the wastewater, such as hydrogen sulfide ($H_2S$) and other volatiles as well as non-volatiles through oxidation and settling.

Oxygen transfer is the process by which oxygen is conveyed from the gaseous phase to the liquid phase. Typical equipment used to deliver oxygen for the digestion process has been surface mechanical type aerators or diffused aeration systems which take atmospheric air (approximately 21% oxygen) and deliver it to the medium via bubbles with a diameter in the range of 0.3 mm and larger.

Mechanical aerators break the surface of the basin liquid allowing the introduction of atmospheric air and ultimately oxygen from this air to enter the basin liquid. This method of providing oxygen to the medium is inefficient and does not promote solids settling in the supernatant column.

Diffused aeration systems include a low pressure, high volume air compressor (blower), air piping system and diffusers that break up the air by dispersing bubbles throughout the aeration tank. The oxygen transfer is directly related to the surface area of these bubbles and the ability for oxygen to transfer from the area of contact. The diffusion of air can be accomplished with several types of diffusers which are normally located near the tank bottom and can include fine bubble and coarse bubble diffusers. In addition to inefficient oxygen transfer these diffusers are plagued with plugging which is especially evident in digesters whose operation includes periodic settling and supernatant removal. This situation is due to typical diffuser installation located on the basin floors and when air is turned off the sludge and sediments can enter the air piping and adhere to the inner walls of the piping and diffusers.

When the word infused is used it means a gas that is infused, enriched in, mixed or combined with a liquid and able to stay as such to complete the task.

When the word oxygen or gas is used it includes: dissolved, micro and/or nano bubbles.

Nozzles or applicators can also include generators if the generators are within the basin, giving direct application (in a controlled fashion) and attached to the delivery system.

When the word oxygen is used it means oxygen or any gas able to accomplish the same, similar, or intended results as disclosed herein.

The foregoing discussion reflects the current state of the art of which the present inventors are aware. Reference to, and discussion of, this information is intended to aid in discharging Applicant's acknowledged duty of candor in disclosing information that may be relevant to the examination of claims to the present invention. However, it is respectfully submitted that none of the above-indicated information discloses, teaches, suggests, shows, or otherwise renders obvious, either singly or when considered in combination, the invention described and claimed herein.

SUMMARY OF THE INVENTION

The present invention provides an improved method and apparatus for the treatment of a receiving medium (e.g., water, wastewater, or surface water) which may be via a gas or nutrient infused liquid. The conveying liquid could also transport absorbed material (e.g., nutrients) or bubbles (e.g., air or oxygen) of varying dimensions (ie. micro, nano, or otherwise) for the treatment of the receiving medium. One embodiment of the inventive method delivers a gas infused water supply to a wastewater digester medium by means of atmospheric air introduced to a water supply via a pressure vessel (or other means to infuse the liquid). This air infused liquid is delivered to the medium to be treated at a critically controlled depth via a surface float delivery system. This interface creates micro bubbles within the liquid which is delivered via nozzles or injectors which are located strategically in the medium allowing an extended air-water (bubbles) interface time. The utilization of atmospheric air infused water allows for the creation of micro bubbles within the medium which improve settling characteristics. This bubble interface allows for more efficient separation of solids from the liquid medium and the resulting sludge settles in the basin allowing anaerobic digestion to occur without oxidizing the sludge blanket.

Another embodiment of the inventive method delivers an oxidized water supply to a wastewater digester medium by means of pure oxygen introduced to a water supply via a pressure vessel (or other means to infuse the liquid) which is efficient and low maintenance. This oxygen infused liquid is delivered to the medium to be treated at a critically controlled depth via a surface float delivery system. The invention involves delivering the oxygen infused liquid via nozzles or injectors which are located strategically in the supernatant allowing an extended oxygen-water interface time without over oxidizing the sludge blanket below. This method would allow for aerobic or anaerobic digestion of the wastewater sludge.

Due to oxygen's low solubility and its consequential low rate of oxygen transfer, the delivery of oxygen required to sufficiently meet the needs of aerobic water body treatments oxygen transfer is relatively inefficient using traditional aerator systems. As an example, larger bubbles, which are common to typical diffused air systems, rise fast in a liquid medium reducing the duration of the exposure of the oxidizing gas to the liquid medium, and stir the supernatant solids which adversely affects settling characteristics. The present invention allows oxygen transfer on a microscopic level with the introduction of an infused liquid into a water volume. Supplying an oxygen infused water to a water body in this manner allows the transfer of oxygen more effectively and allows the concentration of oxygen to remain in the water body to maintain an aerobic condition longer.

The invention is in operation and commercially proven, specifically within the wastewater sludge digestion treatment process. One application of the invention utilizes reclaimed wastewater which is delivered to a pressure vessel where it is combined with pure oxygen gas from a bulk storage tank. A wastewater treatment system such as a Blissfield PrO$_2$™ unit combines the reclaimed wastewater and oxygen gas in a vessel at a pressure of approximately 200 pounds per square inch (psi). The oxidized liquid is formed and delivered from the pressure vessel through piping to a 500,000 gallon circular wastewater digester basin at a rate of approximately 7-9 gallons per minute (gpm). The flowing liquid enters the digester basin through four (4) zones each with multiple nozzles mounted onto a manifold. The manifold/nozzle assemblies are located 90 degrees apart within the tankage walls and deliver the oxidized liquid approximately 3 feet below the surface. Applications are not limited to this example and may vary as needed.

The wastewater treatment facility preferably should not use its pre-existing aeration components while the inventive system is in operation, but instead rely entirely on the oxidized water supply. The beneficial results include significant sludge mass reduction along with higher solids content (less water) in the processed sludge. These results provide significant energy savings, provide reduction in sludge hauling traffic and associated costs, and a reduction in the final treatment process once removed from the facility.

In addition to the measured mass reduction and improved solids characteristics the associated decant quality is improved substantially with less solids and reduced nutrients. Decant can be returned daily to the front of the wastewater plant for retreatment and less resources are required for the treatment with the improved supernatant quality. The oxidized water also reacts with the H2S in the water being treated, resulting in a noticeable reduction in odors. In addition to causing odors H2S is very corrosive resulting in component degradation over time, so reduction of H2S also extends component life and reduces maintenance.

This invention thus includes an apparatus used for the purpose of delivering a gas, a liquid, or a gas infused liquid (substances) into a receiving liquid (medium) for chemical/mechanical and/or biological treatment. The substance being delivered and the characteristics of the receiving medium can be variable and are specific to each application. The receiving medium may be contained by a manmade structure (e.g., a concrete/steel erected basin) or natural system (e.g., a lake or pond). The apparatus allows for the introduction of the infused liquid with the flexibility to meet the immediate requirements of the interface with the substance and medium by means of logic controllers, electrical components, mechanical devices (e.g. flotation devices), and electromechanical elements. The following substance characteristics may be controlled through automation to meet the immediate system requirements: flow rate; velocity; trajectory of delivery; and submergence depth. The apparatus may be free standing in a water body or constructed as part of a hydrostatic structure.

The invention involves delivering micro bubbles via the float system allowing an extended oxygen-water interface time without over oxidizing the sludge blanket below.

One embodiment delivers micro bubbles or an oxidized water supply by means of pure oxygen introduced to the water supply via a pressure vessel or other means to infuse the liquid, into a lift station. This oxygen infused liquid is delivered to the medium to be treated at a critically controlled depth via a surface float delivery system. The invention involves delivering the micro bubbles or the oxygen infused liquid via nozzles which are located strategically in the supernatant allowing an extended oxygen-water interface time without over oxidizing the sludge blanket below.

It is therefore an object of the present invention to provide a new and improved method and apparatus for water treatment, and in particular, wastewater treatment.

It is another object of the present invention to provide a new and improved method for treatment of wastewater which reduces sludge mass and increases solids content in the processed sludge.

A further object or feature of the present invention is a new and improved wastewater digester apparatus with improved decant quality.

An even further object of the present invention is to provide a novel wastewater treatment process with noticeable reduction in odors.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

The invention will be better understood and objects other than those set forth above will become apparent when consideration is given to the following detailed description thereof. Such description makes reference to the annexed drawing wherein:

FIG. 1 is a view of an apparatus for delivery of a gas infused liquid into a wastewater digester.

DETAILED DESCRIPTION OF THE INVENTION

Referring now to FIG. 1, there is illustrated therein a view of a first preferred embodiment of the invention, for a new and improved apparatus for delivery of a gas infused liquid into a wastewater digester, comprising:

Feed line 1 is a flexible coiled line that allows delivery of fluid throughout the range of the float assembly.

Wall bracket 2 is an adjustable bracket that mounts over a wall basin wall to support the delivery assembly.

Float 3 is a buoyant device that rests on the basin fluid surface to allow vertical movement based on the fluid level while maintaining a set submergence level for the nozzle assembly below.

Float guide rail 4 is a fixed rail system that controls the float assembly movement in the vertical direction.

Transfer pipe 5 conveys media from feed line 1 to a distribution manifold.

Distribution manifold 6 delivers media from transfer pipe 5 to the nozzle assembly.

Nozzle shield 7 is a protective cover to prevent submerged articles from catching on the nozzle tips.

Nozzles 8 deliver the media at a selected velocity and volume.

Wall stand-off 9 provides support against horizontal force from the nozzle assembly.

The inventive method and apparatus provides a digester processing system for reduced biosolids, increased decant, and odor control. The digester processing system enhances digester performance by introducing a gas infused liquid such as pure oxygen enriched water into the upper portion of the digester. The amount of oxygen, or parts per million (ppm) of oxygen that is infused into the water can vary but it works best if it remains in solution by either being a micro/nano bubble or being dissolved, such that the oxygen stays in solution with little or no off gassing. One example of a source for this gas infusion is the PrO2 gasification system manufactured by Blissfield Manufacturing Company of Blissfield, Mich., though other sources and units manufactured by other companies could also be used. An example of the concentration of oxygen is between 100 ppm and 500 ppm, but it is not limited to that amount as the need may vary according to the size of the digester, flow through rate of waste activated sludge or any other waste stream, or desired results.

The traditional blower/diffuser system for the digester is preferably turned off and the oxygen enriched water is added to the top portion of the digester. This will control odor while it also aids in settlement and nutrient reduction. It is possible to treat the digester from the bottom or middle giving different results but only if these results are desired.

This oxygen enriched water is best applied through a system that allows the nozzles or applicators to remain within the top ⅓ of the water column but usually to remain about 3-4 feet below the water surface. Because the water column can vary in a digester, a system that allows applicator depth adjustment is recommended. This can be as simple as but not limited to a floating applicator system or any other system that regulates the injection point and keeps it proportional to the liquid level including: manual, mechanical, electronic, or any other method of regulating the application of pure oxygen enriched water to the varied liquid levels in the digester.

The system should introduce the oxygen enriched liquid at a rate that does not disturb settling. An example rate of between 5-50 gallons per minute (but not limited to this rate because of digester size) can be administered throughout the upper portion of the water column through a series of applicators such as tubes, injectors, or nozzles.

The oxygen enriched water controls odor without using conventional blowers and diffusers. Conventional blowers and diffusers control odor by mixing atmospheric air throughout the water column. However, it is preferable not to mix the contents but rather settle the contents. This can usually only happen if odor is controlled and this happens by applying the oxygen enriched liquid to the top portion of the digester to control the odor while it performs the process.

Because the 100 ppm-500 ppm of oxygen enriched water is introduced at a rate that does not disturb settling, the enriched water then quickly and effectively acts on the suspended solids and nutrients by dropping them out of the water column. The decanted water is usually clearer and because of odor control and settling, daily decanting is usually able to be achieved.

The upper treatment zone does not limit the bottom treatment of the actual sludge blanket. The sludge blanket can be treated either anaerobically or aerobically by the oxygen but should be controlled as to how much oxygen is applied to it. An optimal range, usually less than 3 ppm, of dissolved oxygen is best to allow the biological treatment, thereby reducing the sludge blanket/biosolids that needs to be further treated, repurposed, or disposed of.

Accordingly, this first embodiment of an inventive apparatus provides a digester processing system with two integral parts: a gas enriched fluid source such as oxygen enriched water; and a float or guide system.

The gas enriched fluid source should control odor, produce a density difference in the water column (preferably at the top), settle the solids, treat the organic volatile solids, reduce the biosolids or sludge blanket, produce a clear or clearing decant, and sometimes reduce nutrients in the clearing decant if parameters are being met. It should also produce a density change in the water column at the point of delivery. The density difference is achieved by the amount of dissolved gas in the fluid or the amount of micro or nano type bubbles that stay in solution long enough to produce the desired results. Oxygen enriched water is not limited except by its own limitations of how much gas can be retained in a liquid solution and the particular need. An example could be oxygen enriched water at 100-500 ppm.

The preferred delivery point is applied through applicators, injectors, nozzles or such that are attached to the guide system.

The following is an example of the system being applied to a wastewater digester with oxygen enriched water and the guide system:

First, all traditional methods of aerating and mixing an aerobic digester should be turned off. For example, while a 250,000 gallon digester might have a 100 horsepower blower or mixer, it should be disabled during the operation of the inventive apparatus.

Next, oxygen enriched water is applied through the applicators attached to the guide system into the top portion of the digester, for example approximately 3 feet below the surface of the fluctuating wastewater column. The guide system is important because digester water columns fluctuate as they are emptied and filled. This top applied oxygen enriched water will then allow enough oxygen to control any potential odor due to the blowers being turned off. Because the blowers are also mixers the turned off blowers allows for settling while the oxygen enriched water applied by the guide system controls odors.

Next, settling is accelerated by a density change that is being introduced into that top portion of the digester water column by the oxygen enriched water. This density difference will cause the suspended solids to begin to separate and settle out of the water column quicker creating a large amount of clear or clearing decant. This decant, or a portion thereof, can then be removed from the digester and sent back to the head works of the plant making room for more waste to enter the digester from the clarifier. This process is repeated daily until such a time as need dictates the removal of remaining settled solids before starting the process all over again. Average municipal digesters usually only decant one day a week by turning off their blowers/mixers, settling the solids, and decanting before turning on the blowers again to avoid odors. The inventive method allows for daily processing and decanting without odors and can go for extended periods (e.g., 30 days or more) before removing settled solids. The solids in the top portion of the digester are also being reduced proportionately by the pounds per hour of oxygen being delivered.

A further objective is to reduce nutrients out of the available decant that is being created at the top of the digester and before sending the decant back to the front of the plant. This process of density change, high ppm of oxygen, and time allows for nutrient reduction to take place in the decant. Nitrogen is treated and phosphorous is settled into the sludge blanket below.

The bottom sludge may optionally be treated as desired either anaerobically or by direct or indirect application of oxygen enriched water and other treatments if desired such as nutrients that stimulate biological activity to further reduce biosolids.

Gasses other than oxygen maybe used that may accomplish the same results. In addition, a system may be tailored to be dependent on the waste water plants current operating parameters, capacity, and goals.

As discussed above, traditional wastewater digesters usually operate by mixing the whole column of wastewater either by blowers blowing air through diffusers usually attached to the bottom floor, or by mechanically mixing the entire content of the wastewater within the digester. Traditional digesters are treated from the bottom up when blowers and diffusers are used, or are treated throughout if mixers are used. Neither of these methods allow for daily settling through odor control and rapid settling by being off or through density change. The inventive digester processing system is different in that the gas enriched fluid source (in this case the oxygen enriched water) treats the digester from the top down.

The gas enriched fluid source and float or guide system can also be used for any fluctuating water column where it is desired to achieve any one or combination of odor control; organic, volatile, solids, or nutrient reduction; or any other use. Some examples of applications to treat wastewater besides digesters are: lift stations, EQ (equalization) tanks, holding tanks and even water bodies like storm water ponds or other ponds needing treatment.

While the preferred method of treating wastewater in a digester is to use both the gas enriched fluid source and the float or guide system as described above, in some applications the fluctuating water columns are infrequent and the same results can be achieved without the float or guide system, by moving or locating the applicators so that they remain generally within the top of the water column but below the water surface.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A method for the treatment of a body of water, the method comprising:
   providing an oxygen infused liquid by infusing oxygen into a liquid supply discrete from the body of water being treated; and
   delivering the oxygen infused liquid into the body of water being treated at a rate that does not disturb settling of suspended solids in the body of water and at a controlled depth irrespective of fluctuations in the water level.

2. The method for the treatment of a body of water of claim 1 comprising delivering the oxygen infused liquid into the water medium to be treated at a controlled depth through a surface float delivery system.

3. The method for the treatment of a body of water of claim 1 comprising providing the oxygen infused liquid by infusing pure oxygen into the liquid supply.

4. The method for the treatment of a body of water of claim 1 wherein the liquid supply is infused with oxygen in a pressure vessel.

5. The method for the treatment of a body of water of claim 1 wherein the oxygen infused liquid is delivered via micro bubbles to a wastewater digester through at least one nozzle located in the supernatant of the water medium to be treated.

6. The method for the treatment of a body of water of claim 1 wherein the oxygen infused liquid is delivered to a wastewater digester through at least one nozzle located in the top third of the water column.

7. The method for the treatment of a body of water of claim 1 wherein the oxygen infused liquid is delivered to a wastewater digester through at least one nozzle located approximately three to four feet below the water surface.

8. An apparatus for the delivery of a gas-infused liquid into a wastewater digester comprising:
   a source of gas-infused liquid discrete from the wastewater digester; and
   surface float means to deliver the gas-infused liquid from said source to the wastewater digester medium at a controlled depth and at a rate that does not disturb settling of suspended solids in the wastewater digester medium.

9. The apparatus for the delivery of a gas-infused liquid into a wastewater digester of claim 8 wherein oxygen is infused into the liquid in a pressure vessel.

10. The apparatus for the delivery of a gas-infused liquid into a wastewater digester of claim 8 wherein oxygen or gas infused liquid is delivered through nozzles located in a supernatant of a water medium to be treated.

* * * * *